United States Patent
Yokomori

(10) Patent No.: US 7,422,094 B2
(45) Date of Patent: *Sep. 9, 2008

(54) CLUTCH MECHANISM FOR POWER DEVICE

(75) Inventor: Kazuhito Yokomori, Nirasaki (JP)

(73) Assignee: Mitsu Mining & Smelting Co. Ltd., Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 10/998,161

(22) Filed: Nov. 29, 2004

(65) Prior Publication Data

US 2007/0163857 A1    Jul. 19, 2007

(30) Foreign Application Priority Data

Nov. 20, 2003  (JP) ............................. 2003-400812
Nov. 28, 2003  (JP) ............................. 2003-100811
Nov. 28, 2003  (JP) ............................. 2003-400810

(51) Int. Cl.
*F16D 27/118*    (2006.01)
*E05F 15/00*    (2006.01)
*G05G 5/06*    (2006.01)

(52) U.S. Cl. ...................... 192/84.7; 49/360; 192/48.2; 192/84.21; 192/114 R

(58) Field of Classification Search ....................... None
See application file for complete search history.

(56) References Cited

U.S. PATENT DOCUMENTS

| | | | | |
|---|---|---|---|---|
| 3,073,180 | A * | 1/1963 | Lohr | 192/48.2 |
| 4,530,185 | A * | 7/1985 | Moriya et al. | 49/280 |
| 6,199,322 | B1 * | 3/2001 | Itami et al. | 192/12 D |
| 6,882,120 | B2 * | 4/2005 | Yokomori | 318/55 |
| 7,003,915 | B2 * | 2/2006 | Yokomori | 49/360 |
| 2005/0253414 | A1 * | 11/2005 | Yokomori | 296/146.4 |

* cited by examiner

*Primary Examiner*—Rodney H Bonck
(74) *Attorney, Agent, or Firm*—Browdy and Neimark

(57) ABSTRACT

A clutch mechanism of the present power device comprises a fixed gear member, a moving gear member engaged with the fixed gear member when moving to a clutch connecting position, an armature for moving the moving gear member to the clutch connecting position when rotated relatively to the moving gear member, an electromagnetic coil unit for applying a brake resistance to the armature, and a clutch holding surface for abutting against the moving gear member when the electromagnetic coil unit is turned off in the clutch connecting state and for holding the moving gear member at a brake-clutch connecting position. The abutment of the moving gear member against the clutch holding surface is released by rotating the moving gear member relatively to the armature in a state in which the electromagnetic coil unit is operated.

8 Claims, 8 Drawing Sheets

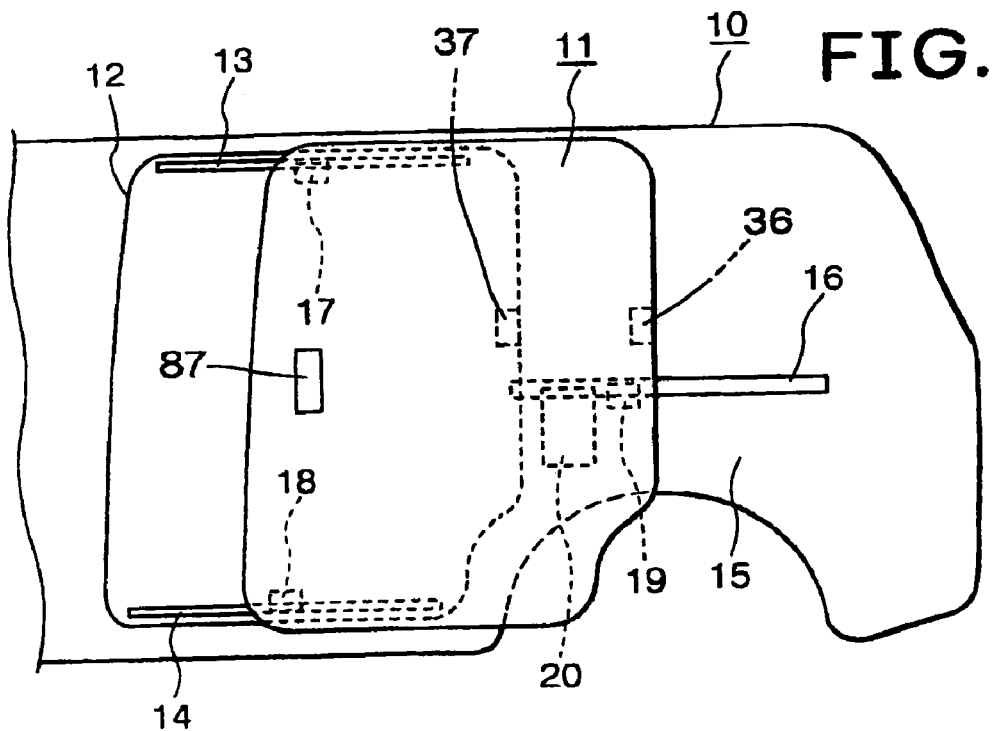
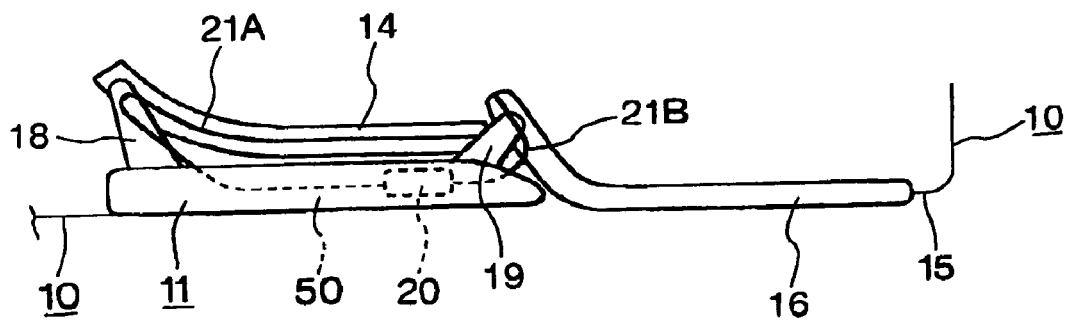
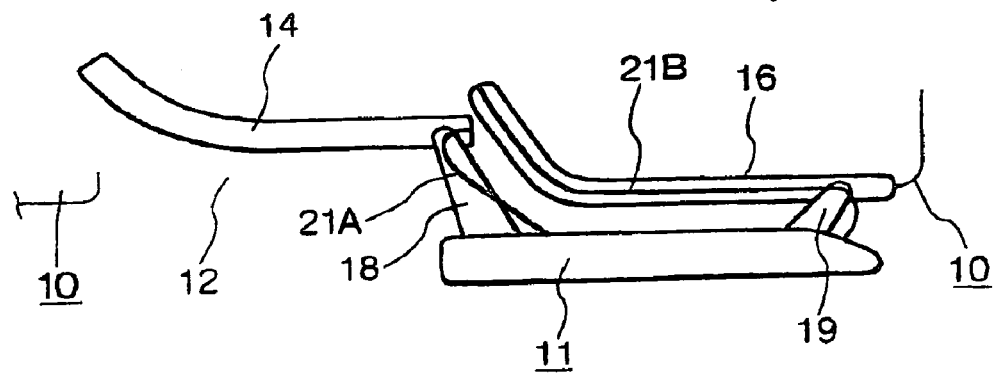

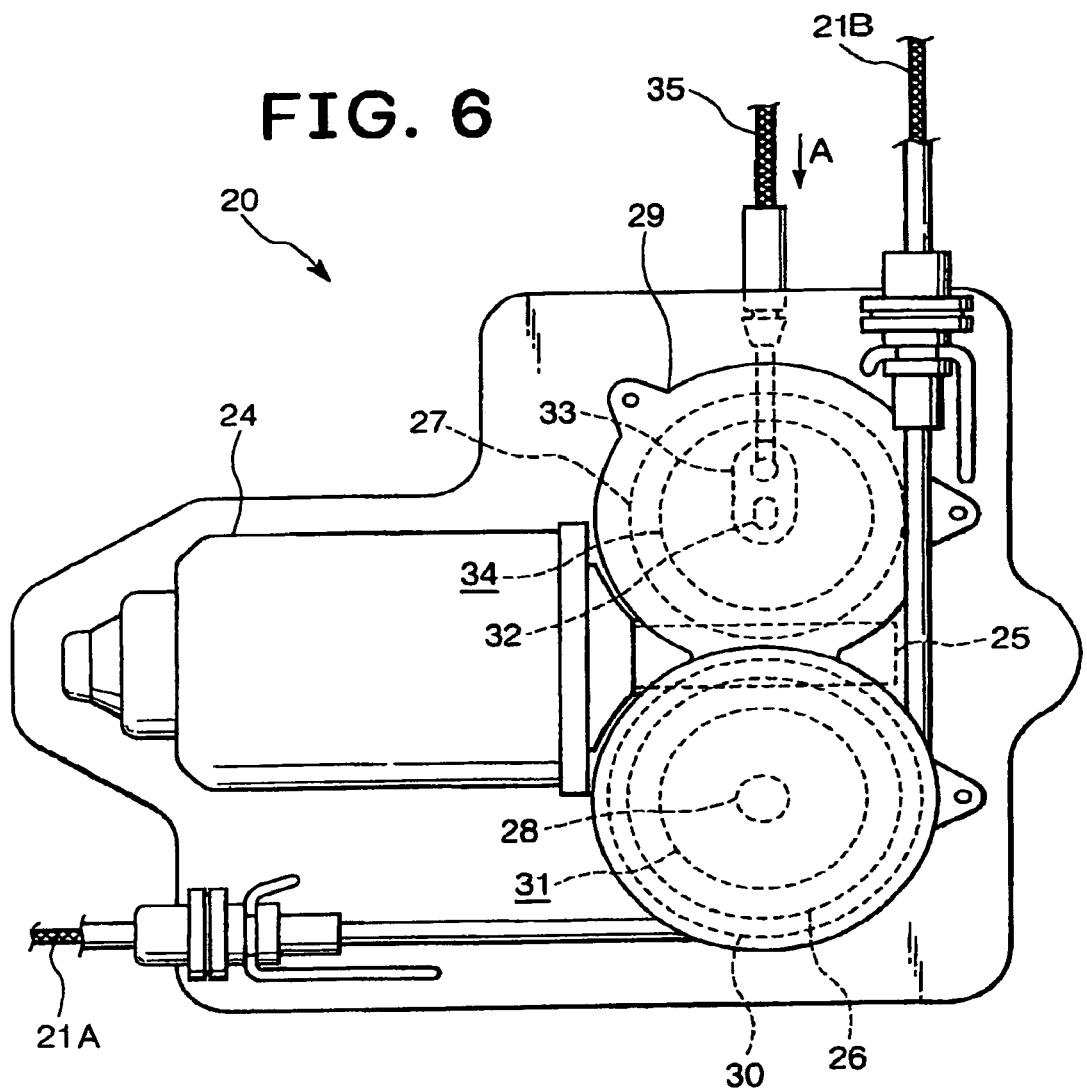
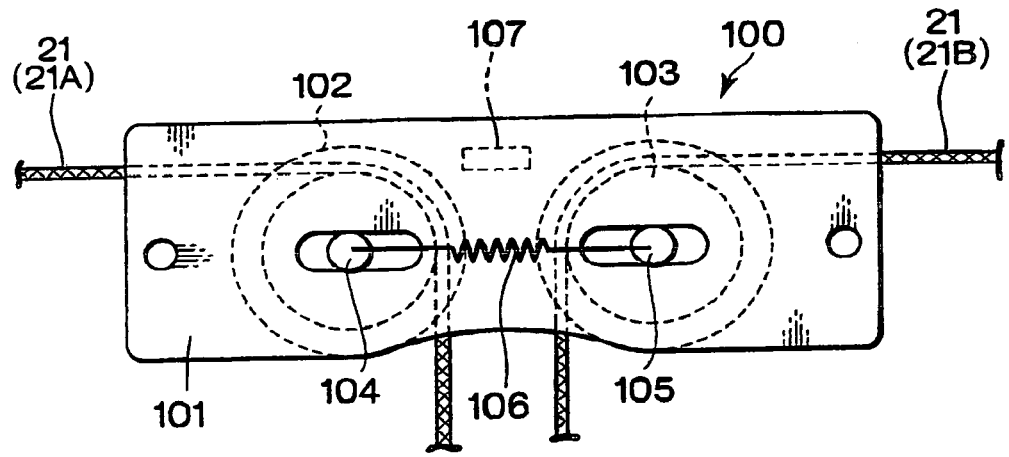

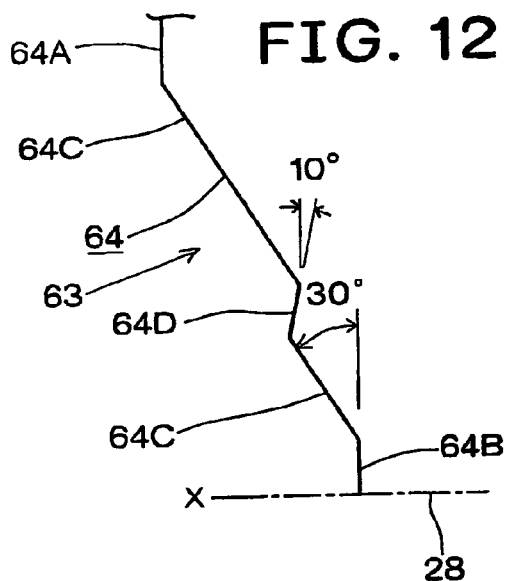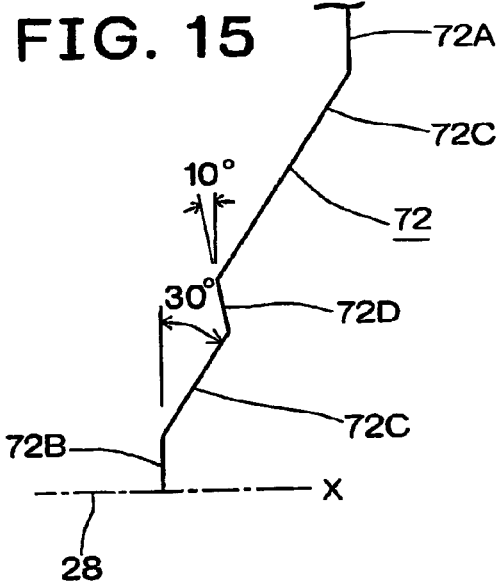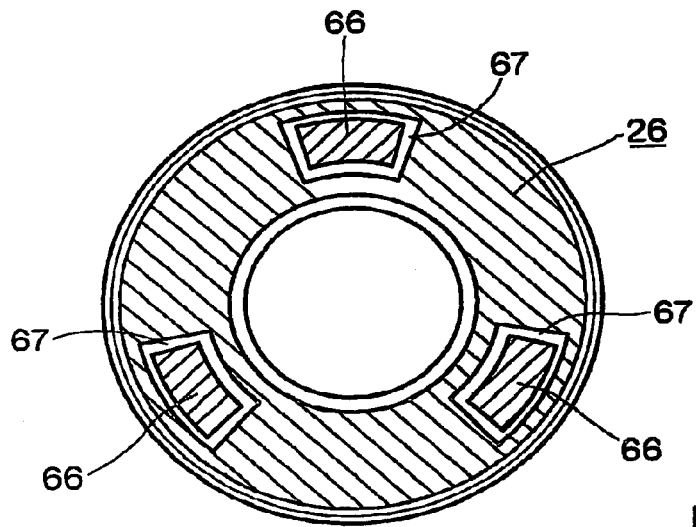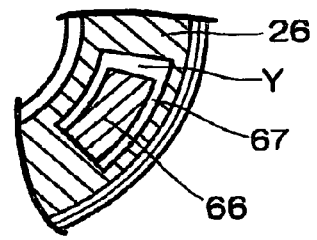

CLUTCH MECHANISM FOR POWER DEVICE

FIELD OF THE INVENTION

The present invention relates to a clutch mechanism for power device, and in particular, it relates to a clutch mechanism which can transmit a large torque by miniature electromagnetic coil unit. Further, the present invention relates to a clutch mechanism which can hold a clutch connecting state even in a state in which the electromagnetic coil is turned off. As an example of the power device in which the clutch mechanism of the present invention is used, a power slide device can be cited, which allows a vehicle slide door to slide in a door-opening direction and in a door-closing direction.

DESCRIPTION OF THE RELATED ART

In a conventional vehicle slide door, there has been provided a power device such as a power slide device to allow a slide door to slide in a door-opening direction and a door-closing direction by a motive power, a power close device to allow a slide door at a half-latched position to move in a full-latched position by a motive power, a power release device to allow the latch device of a slide door to unlatch by a motive power, and the like.

The power device, particularly, the power device used as a power slide device is provided with a clutch mechanism to transmit a motive power of a motor to a slide door. The clutch mechanism is classified into a mechanical clutch mechanism and an electromagnetic clutch mechanism, and each mechanism has advantages and drawbacks, respectively.

The advantage of the mechanical clutch mechanism is that it has a small number of electrical components, and can be manufactured at low cost. However, when a clutch is changed from a disconnecting state to a connecting state or vice verse, it causes a time lag. This time lag makes a control program of the mechanical clutch mechanism complicated.

In contrast to this, in the case of the electromagnetic clutch mechanism, a changeover from the disconnecting state to the connecting state or vice versa is instantaneously performed, and its control program can be exceptionally simplified. However, the electromagnetic clutch mechanism which can be applied to a high output power device such as the power slide device has a drawback in that its electromagnetic coil becomes large sized and expensive.

The reason why the electromagnetic coil becomes large sized will be described. The electromagnetic clutch mechanism has a variety, and can be classified into a friction clutch and a dog clutch. In the case of the friction clutch, an armature is brought into contact with a frictional rotor plate by magnetic force of the electromagnetic coil unit, so that the clutch is connected, and the magnitude of the output which can be transmitted by the clutch depends on the coefficient of friction between the armature and the friction rotary plate. Hence, in the case of a high output power device such as the power slide device, a strong electromagnetic coil unit is required so that a high coefficient of friction can be obtained.

In the case of the dog clutch, a rugged engaging unit of the armature is engaged with rugged portions of the rotary plate by magnetic force of the electromagnetic coil, so that the clutch is connected. In this manner, if it is a mutual engagement between the rugged portions, a delivered horsepower is not swayed by engaging force, but in the case of the dog clutch, the moving distance of the armature necessary to engage the armature with the rotary plate becomes exceptionally long. The moving distance of the armature of the friction clutch is normally 1 mm or less, and even by the magnetic force of a small electromagnetic coil unit, the armature can be moved in its fullness. However, the moving distance of the armature of the dog clutch is normally 3 to 5 mm. Since the magnetic force is extremely reduced when the distance becomes long, the electromagnetic coil which can move the armature of the claw type has been unavoidable to become large sized after all.

To solve the above described problem, the present applicant has proposed a power device comprising a rational clutch mechanism, which merges the mechanical type clutch mechanism and the electromagnetic type clutch mechanism (U.S. patent application Ser. No. 10/611,642).

Further, as improvement invention of the prior application, the present applicant has also proposed a power device comprising a clutch mechanism, which can allow a clutch connecting state to continue even when an electromagnetic unit is turned off (application filed to the U.S. Patent Office on Oct. 25, 2004).

SUMMARY OF THE INVENTION

An object of the present invention is to provide a releasing method of a clutch connecting state in the clutch mechanism in the clutch mechanism of a power device in which, even when an electromagnetic coil unit is turned off, a clutch connecting state can be continued.

BRIEF DESCRIPTION OF THE DRAWINGS

FIG. 1 is a side view of a vehicle comprising a power unit of the present invention;

FIG. 2 is a view showing a relation between the power unit and a wire cable, in which a slide door is closed;

FIG. 3 is a view showing a relation between the power unit and the wire cable, in which a slide door is open;

FIG. 6 is a side view of a power unit;

FIG. 8 is a top plan view of a tension mechanism of the power unit;

FIG. 12 is a detailed view of a cam surface of the cam member;

FIG. 13 is a sectional view showing an engaging state between an engaging groove of a first worm wheel and a leg portion of the moving gear member;

FIG. 14 is a schematic view showing a gap between the engaging groove and the leg portion;

FIG. 15 is a sectional view showing a clutch holding surface of the moving gear member;

DESCRIPTION OF THE PREFERRED EMBODIMENT

Figure 4:
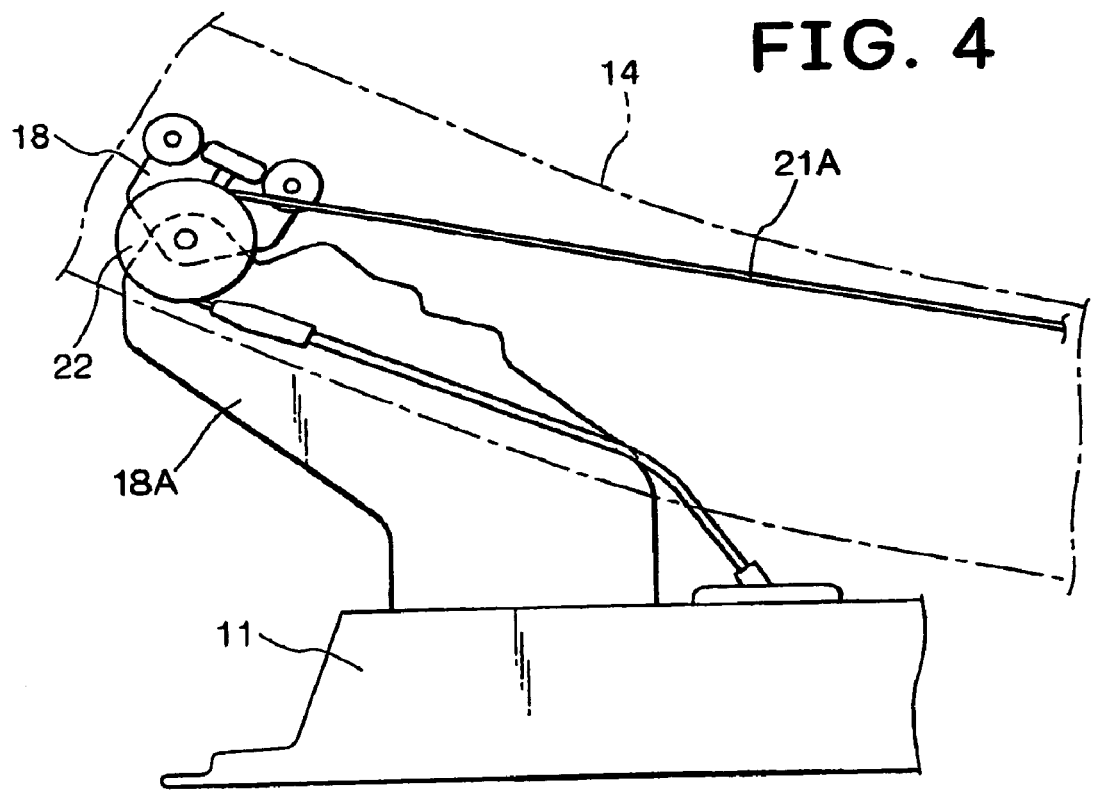
FIG. 4 is an enlarged top plan view of a lower roller bracket of a lower rail and the slide door.

Embodiment of the present invention will be described with reference to the drawings. FIGS. 1 to 3 shows a vehicle body 10, a slide door 11 slidably attached to the vehicle body 10, and a door aperture 12 which can be closed by the sliding door 11. The vehicle 10 in the vicinity of the upper portion of the door aperture 12 is fixed with an upper rail 13, and the vehicle body 10 in the vicinity of the lower portion of the door aperture 12 is fixed with a lower rail 14. A quarter panel 15 which is a rear side surface of the vehicle body 10 is fixed with a center rail 16. The slide door 11 is provided with an upper roller bracket 17 slidably engaged with the upper rail 13, a lower roller bracket 18 slidably engaged with the lower rail 14, and a center roller bracket 19 slidably engaged with the center rail 16. Each of the roller brackets 17, 18 and 19 is suitably swingably journaled to the slide door 11.

The slide door 11 slides between a door-closed position (FIG. 2) to block the door aperture 12 and a door-open position. The door-open position is classified into two types of a full-door-open position shown in FIG. 3 (normally having a width of several centimeters) and a semi-door-open position (see FIG. 1) in the middle of the door-closed position and the full-door-open position.

Figure 7:
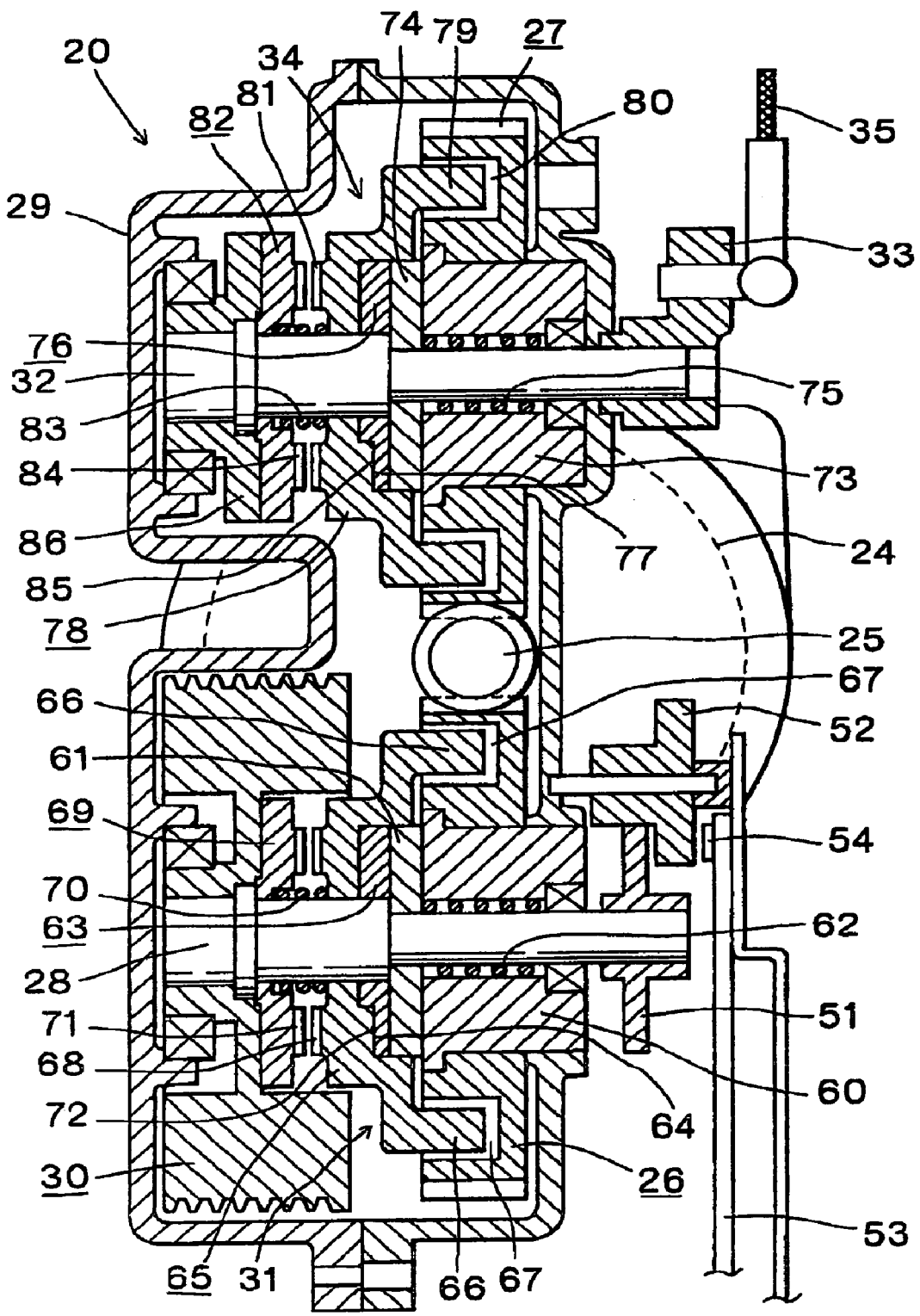
FIG. 7 is a sectional view of the power unit.

An inner space 50 (FIG. 2) of the slide door 11 is provided with a power unit 20 comprising a motor motive power. The power unit 20, as shown in FIGS. 6 and 7, is provided with a wire drum 30 for winding and paying out wire cables, and the wire drum 30 is connected with base ends of two wire cables, that is, a door-opening cable 21A and a door-closing cable 21B. When the wire drum 30 rotates in a door-opening direction, the door-opening cable 21A is wound up, and the door-closing cable 21B is pulled out, and when the wire drum 30 rotates in a door-closing direction, the door-opening cable 21A is pulled out, and the door-closing cable 21B is wound up.

As shown in FIG. 4, the lower roller bracket 18 is journaled to a lower stay 18A of the slider door 11. The lower bracket 18 has a pulley 22 of a vertical shaft center. The door-opening cable 21A is pulled outside of the slide door 11 in the vicinity position of the lower stay 18A, and after passing through the front side of the pulley 22, is extended backward inside the lower rail 14, and is fixed to the rear end portion of the lower rail 14 or the vehicle body 10 in the vicinity of the rear end portion of the lower rail. In this manner, when the door-opening cable 21A is wound up in a door-closed state, the slide door 11 is slid backward (in the door-opening direction).

Figure 5:
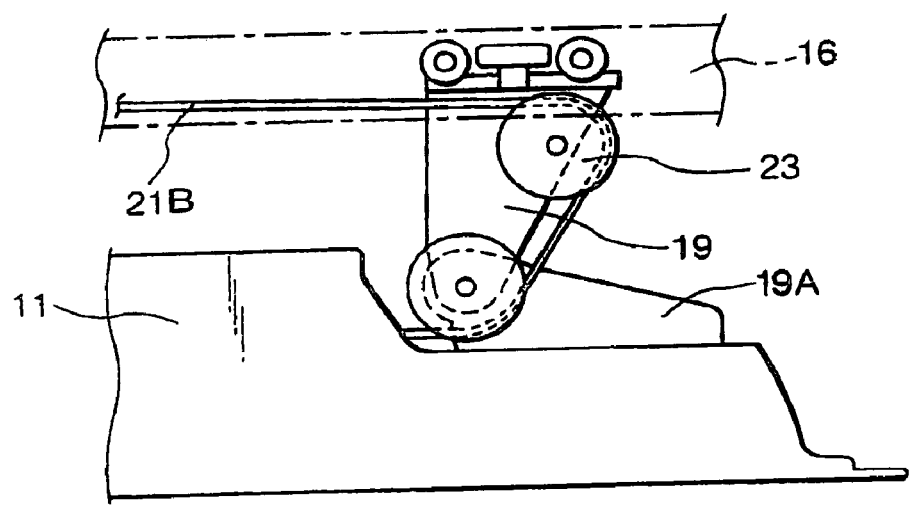
FIG. 5 is an enlarged top plan view of the center roller bracket of a center rail and the slide door.

As shown in FIG. 5, the center roller bracket 19 is journaled to a center stay 19A of the slider door 11. The center bracket 19 has a pulley 23 of a vertical shaft center. The door-closing cable 21B is pulled outside of the slide door 11 in the vicinity position of the center stay 19A, and after passing through the backside of the pulley 23, is extended frontward inside the center rail 16, and is fixed to the front side of the center rail 16 or the vehicle body 10 in the vicinity of the front side portion of the center rail. In this manner, when the door-closing cable 21B is wound up in a door-open state, the slide door 11 is slid frontward (in the door-closing direction).

FIG. 8 shows a tension mechanism 100 to maintain the tension of the wire cable 21 at a proper pressure. The tension mechanism 100 is preferably provided in the power unit 20. Inside a case 101 of the tension mechanism 100, there are slidably provided a pair of tension rollers 102 and 103 against which cables 21A and 22B abut. Between a roller shaft 104 of the roller 102 and a roller shaft 105 of the roller 103, there is provided a tension spring 106. The movement (moving distance) of the tension rollers 102 and 103 is detected by a tension sensor 107.

In FIGS. 6 and 7, the output shaft of a high output motor 24 is attached with a cylindrical worm 25, and both sides of the shaft center of the cylindrical work 25 is provided with a first worm wheel 26 and a second worm wheel 27 in such a manner as to engage with the cylindrical worm 25, respectively. The first worm wheel 26 is journaled inside a case 29 of the power unit 20 by a first support shaft 28, and the first support shaft 28 is journaled with the wire drum 30 also. Between the first worm wheel 26 and the wire drum 30, there is provided a first clutch mechanism 31 to be described later in detail, and when the first clutch is turned on, the rotation of the first worm wheel 26 is transmitted to the wire drum 30, and when turned off, the wire drum 30 becomes free from the first worm wheel 26. Hence, in FIG. 6, when the first clutch mechanism 31 is turned on during clockwise rotation of the first worm wheel 26 by forward rotation of the motor 24, the wire drum 30 also makes a clockwise rotation, so that the door-opening cable 21A is pulled out, and the door-closing cable 21B is wound up. On the contrary, when the first clutch mechanism 31 is turned on during counter-clockwise rotation of the first worm wheel 26 by reverse rotation of the motor 24, the wire drum 30 also makes a counter-clockwise rotation, so that the door-opening cable 21A is wound up, and the door-closing cable 21B is pulled out. A function to rotate the wire drum 30 by the motor 24 so as to wind up and pull out the cables 21A and 21B becomes the power slide function (device) of the power unit 20.

With respect to the relation between the cylindrical worm 25 and the first worm wheel 26, while the cylindrical worm 25 does not practically rotate by rotational force applied to the first worm wheel 26, it is desirable in view of fail-safe conception that the cylindrical worm 25 may be rotated if a considerably strong force is applied to the first worm wheel 26.

The second worm wheel 27 is journaled by the second support shaft 32 inside the case 29 of the power unit 20. One end portion of the second support shaft 32 penetrates the case 29 and protrudes outward, and the protruded end thereof is fixed with a swing arm 33. Between the second worm wheel 27 and the second support shaft 32, there is provided a second clutch mechanism 34. When a second clutch mechanism 34 is turned on, the rotation of the second worm wheel 27 is transmitted to the swing arm 33 through the second support shaft 32, and when turned off, the swing arm 33 becomes free from the second worm wheel 27.

Figure 9:
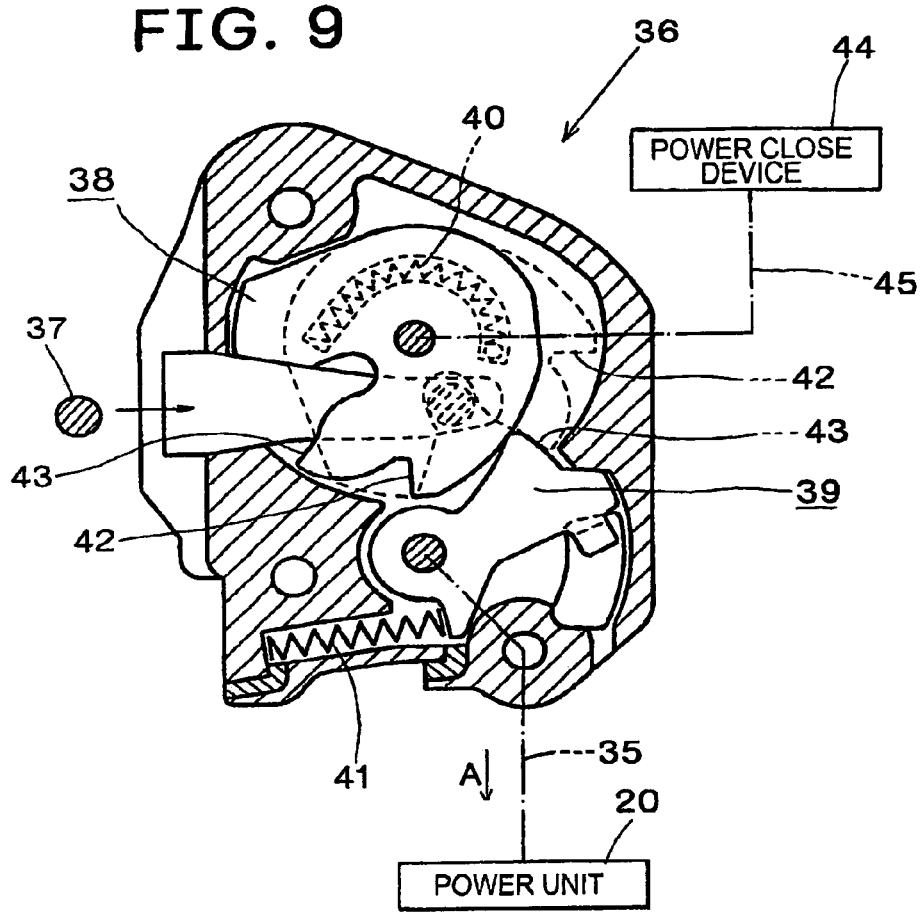
FIG. 9 is a sectional view of a door latch unit.

A rocking end of the swing arm 33 is engaged with one end of a release cable 35. The other end of the release cable 35 is connected to a door latch unit 36 (FIGS. 1 and 9) of the slide door 11. When the release cable 35 is pulled in a direction to an arrow A by rocking of the swing arm 33, a door latch unit 36 is configured to be released. An example of the door latch unit 36 is shown in FIG. 9. The door latch unit 36 comprises a latch 38 engaging with a striker 37 fixed to the vehicle body 10 and a ratchet 39 engaging with the latch 38. The latch 38 is urged to a clockwise direction by elastic force of a latch spring 40, and the ratchet 39 is urged to a counter-clockwise direction by elastic force of a ratchet spring 41. When the slide door 11 moves to a door-closing direction, the latch 38 abuts against the striker 37, and rotates from a door-open position (unlatched position) shown by a solid line till a full-latched position (position shown by a dotted line) in which the ratchet 39 engages with a full-latch step portion 43 of the latch 38 through a half-latched position in which the ratchet 39 engages with a half-latch step portion 42 of the latch 38, and when latch 38 comes to the full-latched position, the slide door 11 is completely closed. The release cable 35 is operatively connected to the ratchet 39, and when the release cable 35 is pulled in a direction to the arrow A, the ratchet 39 breaks away from the latch 38, so that the door latch unit 36 is unlatched, and the slider door 11 is put into the door-open state. The function to unlatch the door latch unit 36 by rocking of the swing arm 33 by the motive power of the motor 24 becomes a power release function of the power unit 20.

The first clutch mechanism 31 shown in FIG. 7 is a clutch comprising an electromagnetic coil unit 60, which is turned on and off by electrical control. Schematically, when the electromagnetic coil unit 60 is turned on, the first clutch mechanism 31 is put into a connecting state, and when turned off, the mechanism 31 is put into a disconnecting state. However, to be described later, even when the electromagnetic coil unit 60 is turned off, the mechanism 31 has a characteristic capable of maintaining a clutch connecting state (brake-clutch connecting state). The electromagnetic coil unit 60 is disposed around the first support shaft 28, and is cylindrical. The electromagnetic coil unit 60 is fixed to the case 29, and the first support shaft 28 is rotatable for the electromagnetic coil unit 60. The first worm wheel 26 is rotatably supported by the outer periphery of the electromagnetic coil unit 60. In FIG. 7, close to the left of the electromagnetic coil unit 60, there is disposed a circular armature 61. The circular armature 61 is rotatably journaled by the first support shaft 28, and moreover, is movable in the shaft direction. The armature 61 is urged leftward so as to break away from the electromagnetic coil unit 60 by weak elastic force of a brake release spring 62, and abuts against the step portion of the first support shaft 28. The right surface of the armature 61, when the electromagnetic coil unit 60 is turned on, is pulled by magnetic force of the electromagnetic coil unit 60 by opposing the elastic force of a break release spring 62, so that it adheres to the left surface of the electromagnetic coil unit 60. Although a friction resistance caused by this adherence becomes a brake resistance necessary for the clutch connection, because, in the first place, a necessary brake resistance is low, and in the second place, since the armature 61 can be disposed close to the electromagnetic coil unit 60, the generated magnetic force of the electromagnetic coil unit 60 in the present invention is needed to be low, thereby making it possible to use an electromagnetic coil which is small in size and light in weight and not expensive.

Figure 10:
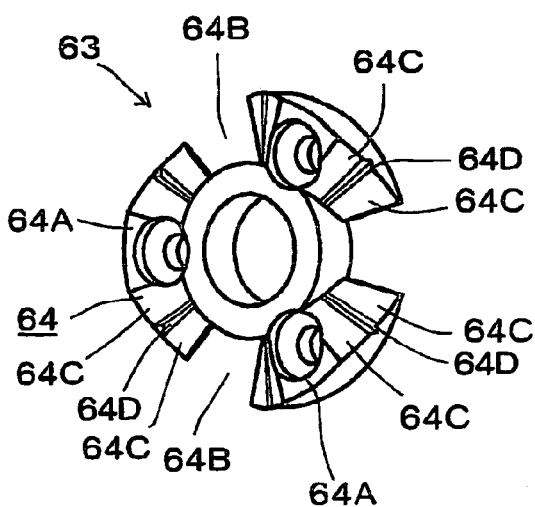
FIG. 10 is an oblique view of a cam member.

The left surface of the armature 61 is fixed with a cam member 63. Since the armature 61 and the cam member 63 integrally moves, they may be integrally formed. A cam surface 64 of the cam member 63, as shown in FIG. 10, is a disciplined circularly rugged surface which connects a top portion 64A protruding leftward in a direction to the shaft center of the first support shaft 28, a bottom 64B formed by notching, and an inclined surface 64C connecting these portions. The inclined surface 64C is a two step inclined surface comprising a clutch holding surface 64D halfway across its surface. The clutch holding surface 64D halfway across the inclined surface 64C comprises a function to maintain the first clutch mechanism 31 in the brake-clutch connecting state when the electromagnetic coil unit 60 is turned off. FIG. 12 shows a detailed shape of the cam surface 64. The cam surface 64C is preferably an inclined surface having about 30 degrees for a shaft center X of the first supply shaft 28, and further, the clutch holding surface 64D is preferably formed in a sweep-back surface having about 10 degrees, though it may be formed in a flat surface orthogonal to the shaft center X.

Figure 11:
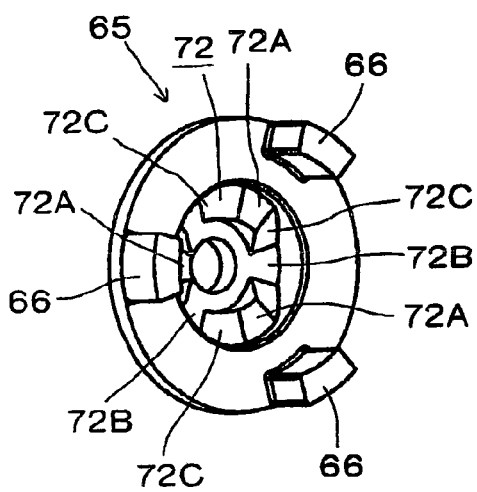
FIG. 11 is an oblique view of a moving gear member.

In FIG. 7, to the left of the cam member 63, there is provided a moving gear member 65 (FIG. 11). The moving gear member 65 is rotatably and movably journaled to the first support shaft 28 in the shaft direction, and its outer periphery is formed with a plurality of leg portions 66 extending toward the right side first worm wheel 26. The right side top end portion of the leg portion 66, as shown in FIGS. 7 and 13, is engaged with an engaging groove 67 of the first worm wheel 26, and by the rotation of the first worm wheel 26, the moving gear member 65 is also rotated in association. While the leg portion 66 is slidable for the engaging groove 67 in the shaft direction of the first support shaft 28, even when the moving gear member 65 moves leftward maximum, the engagement between the leg portion 66 and the engaging groove 67 is not released, and consequently, the moving gear member 65 and the first worm wheel 26 always integrally rotate. Further, between the leg portion 66 and the engaging groove 67, as shown in FIG. 14, there is formed a gap Y in the rotational direction, and the leg portion 66 (moving gear member 65) is set to be able to freely rotate by approximately six degrees for the engaging groove 67 (first worm wheel 26). The left surface of the moving gear member 65 is provided with a moving circular gear portion 68 with the first support shaft 28 as a center.

The left side of the moving gear member 65 is provided with a fixed gear member 69, and between the moving gear member 65 and the fixed gear member 69, there is provided a clutch releasing spring 70 which presses the moving gear member 65 to the right side. The left surface of the fixed gear member 69 is fixed to the wire drum 30, and both of them integrally rotate. The wire drum 30 is fixed to the left end of the first support shaft 28 so as to integrally rotate with the first support shaft 28.

The right surface of the fixed gear member 69 is provided with a fixed circular gear portion 71. When the moving gear member 65 slides leftward along the first support shaft 28 against the elastic force of the clutch releasing spring 70, the moving circular gear portion 68 engages with the fixed circular gear portion 71. A state in which the gear portion 68 and the gear portion 71 are engaged each other is a normal clutch connecting state of the first clutch mechanism 31, and the rotation of the first worm wheel 26 is transmitted to the wire drum 30. In contrast to this, when the moving gear member 65 slides rightward for the first support shaft 28 by the elastic force of the clutch releasing spring 70, the moving circular gear portion 68 breaks away from the fixed circular gear portion 71, and is put into a clutch disconnecting state, and the rotation of the first worm wheel 26 is not transmitted to the wire drum 30.

The moving gear member 65 is formed with a cam surface 72, which slides the moving gear member 65 leftward in collaboration with the cam surface 64 of the cam member 63 against the elastic force of the clutch releasing spring 70. The cam surface 72, as shown in FIG. 11, is a disciplined circular rugged surface comprising a top portion 72A protruding rightward in the shaft center direction of the first support shaft 28, a bottom 72B, and an inclined surface 72C connecting these portions. Although the cam surface 72 comprises a structure approximately symmetrical to the cam surface 64, the present embodiment is not provided with the clutch holding surface. However, if the clutch holding surface is provided in either the cam surface 64 or the cam surface 72, the desired effect can be obtained, and as shown in FIG. 15, the inclined surface 72C of the cam surface 72 may be turned into a two step surface comprising the clutch holding surface 72D.

Figure 17:
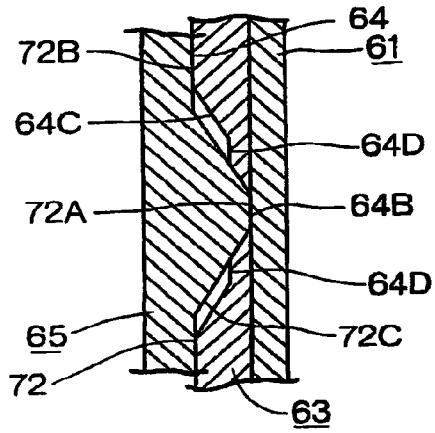
FIG. 17 is a side view showing a cam surface of the cam member and the cam surface of the moving gear member at the clutch disconnecting.
Figure 18:
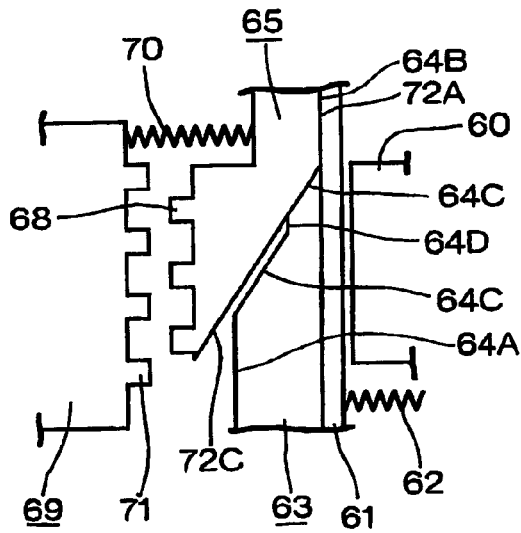
FIG. 18 is a schematic view showing the moving gear member and a fixed gear member at the clutch disconnecting state corresponding to FIG. 17.

When the moving gear member 65 slides rightward by elastic force of the clutch releasing spring 70, normally as shown in FIGS. 17 and 18, the top portion 72A of the cam surface 72 exactly matches the bottom 64B of the cam surface 64, and the moving circular gear portion 68 breaks away from the fixed circular gear portion 71, and is put into a clutch disconnecting state. In this clutch disconnecting state, when the electromagnetic coil unit 60 is turned on, the right surface of the armature 61 is pulled and adhered to the left surface (friction surface) of the electromagnetic coil unit 60 by magnetic force against the elastic force of the brake releasing spring 62, so that the armature 61 and the cam member 63 are given a brake resistance. Subsequently, when the moving gear member 65 (cam surface 72) is rotated by motive power of the motor 24, since the cam member 63 is in a state in which the rotation is controlled by the break resistance, as shown in FIG. 19, due to wedge effect between cam surfaces, the cam surface 72 and the cam surface 64 of the cam member 63 are phase shifted, and the moving gear member 65 is pushed leftward against the elastic force of the clutch releasing spring 70, and as shown in FIG. 20, the moving circular gear portion 68 engages with the fixed circular gear portion 71 so as to be put into a normal clutch connecting state.

Figure 19:
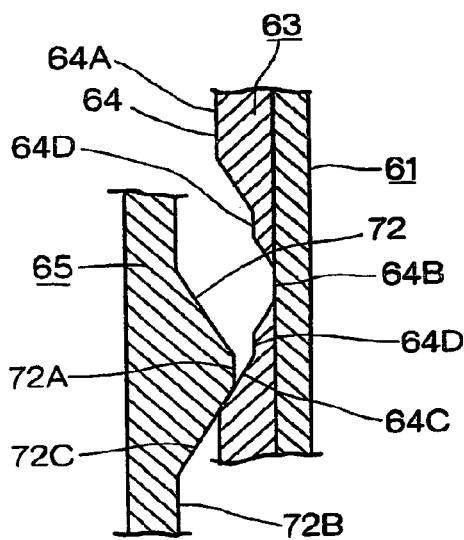
FIG. 19 is a side view showing the cam surface of the cam member and the cam surface of the moving gear member at the clutch connecting state.
Figure 20:
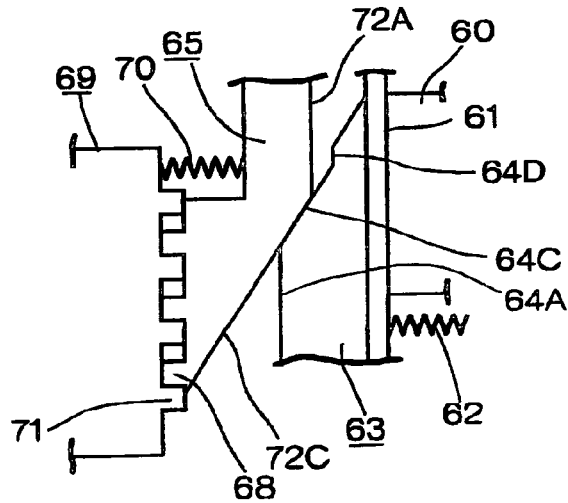
FIG. 20 is a schematic view showing the moving gear member and the fixed gear member at the clutch connecting state corresponding to FIG. 19.
Figure 21:
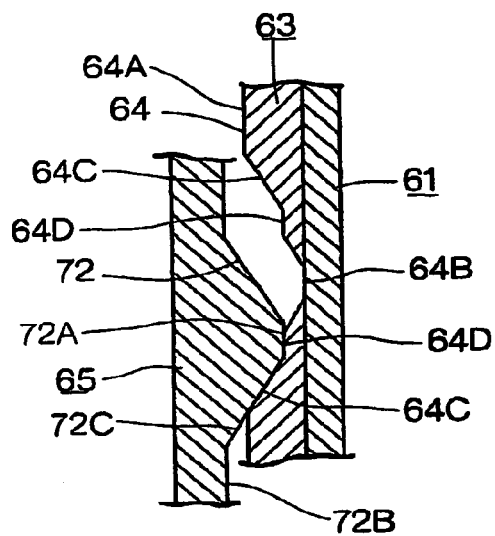
FIG. 21 is a side view showing the cam surface of the cam member and the cam surface of the moving gear member at a brake-clutch connecting state in an off state of an electromagnetic coil unit.
Figure 22:
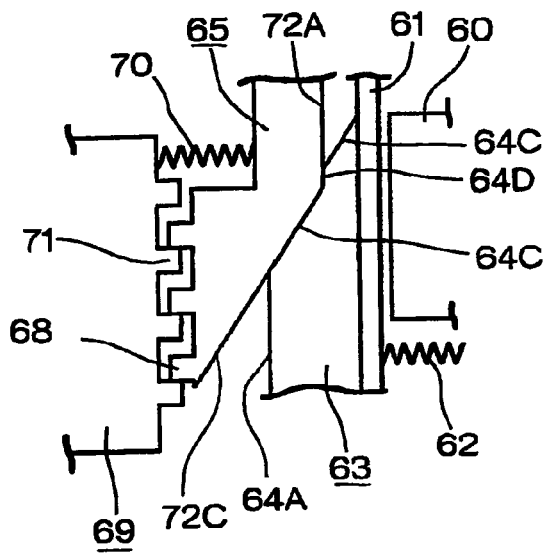
FIG. 22 is a schematic view showing the moving gear member and the fixed gear member of the brake-clutch connecting state corresponding to FIG. 21.

When the motor 24 and the electromagnetic coil unit 60 are both turned off in the normal clutch connecting state of FIGS. 19 and 20, the armature 61 and the cam member 63 are released from the brake resistance. Then, by the elastic force of the clutch releasing spring 70, the moving gear member 65 is moved rightward, while rotating the cam member 63 in a flank direction (downward in FIG. 19), and before the moving gear member 65 comes off from the engaging state with the fixed gear member 69, as shown in FIGS. 21 and 22, the top portion 72A of the moving gear member 65 abuts against the clutch holding surface 64D of the cam member 63, and in this manner, the moving gear member 65 is unable to rotate the cam member 63, and at the same time, is controlled also in the rightward movement. Hence, even when the electromagnetic coil unit 60 is in an off state, the engagement between the moving gear member 65 and the fixed gear member 69 is maintained, and the first clutch mechanism 31 is put into a brake-clutch connecting state.

In the brake-clutch connecting state of FIGS. 21 and 22, due to resistance by the abutment between the top portion 72A and the clutch holding surface 64D, the moving gear member 65 and the armature 61 as well as the cam member 63 are maintained in a state in which they rotate Integrally. Consequently, even when the fixed gear member 69 is rotated upward so that the moving gear member 65 is moved upward in FIG. 22, since the armature 61 and the cam member 63 are also associatingly moved upward, the brake-clutch connecting state is not released. While a friction force between the top portion 72A and the clutch holding surface 64D necessary to maintain an integral state between the moving gear member 65 and the cam member 63 can be secured even when the clutch holding surface 64D is a flat surface orthogonal to the shaft center X of the first support shaft 28, if the clutch holding surface 64D is turned into a sweep-back surface having approximately 10 degrees, a good friction can be obtained.

The abutment between the top portion 72A and the clutch holding surface 64D, similarly to "Brake-clutch connection manual releasing control" to be described later, can be released first by turning on the electromagnetic coil unit 60, and then, by moving the moving gear member 65 upward relatively for the armature 61 and the cam member 63 in FIGS. 17 and 18. The rotational angle of the moving gear member 65 required at this time is approximately five degrees, and is set smaller than the free rotational angel (approximately six degrees) of the moving gear member 65 obtained by the gap Y formed between the leg portion 66 and the engaging groove 67.

The second clutch mechanism 34, similarly to the first clutch mechanism 31, has a cylindrical electromagnetic coil unit 73, a circular armature 74, a brake releasing spring 75, a cam member 76, a cam surface 77 of the cam member 76, a moving gear member 78, leg portions 79, engaging grooves 80, a circular moving gear portion 81, a fixed gear member 78, a clutch releasing spring 83, a fixed circular gear portion 84, and a cam surface 85 of the moving gear member 78. The fixed gear member 82 of the second clutch mechanism 34 is fixed to a receiving member 86 fixed to the left end of the second support shaft 32. The second clutch mechanism 34 does not comprises the brake-clutch connecting state.

In FIG. 9, reference numeral 44 denotes a power close device to be mounted inside the slide door 11. The motor motive power of the power close device 44 is transmitted to the latch 38 of the door latch unit 36 through a close cable 45. In the illustrated embodiment, the power close device 44 is a separate device from the power unit 20. The power close device 44, when the latch 38 comes to a half-latched position by the movement of the slide door 11 in the door-closing direction, pulls the close cable 45 so as to rotate the latch 38 from the half-latched position to the full-latched position, thereby closing the slide door 11 in its entirety.

In FIG. 7, one end portion of the first support shaft 28 penetrates the case 29 and protrudes outward, and the protruded end thereof is fixed with a gear 51. The gear 51 is engaged with a rotational member 52. The rotational member 52, when the first support shaft 28 rotates by the rotation of the wire drum 30, rotates in association with this rotation. Reference numeral 53 denotes a control substrate of the power unit 20, and the control substrate 53 is directly mounted with a drum sensor 54 to detect the rotation (and rotational direction and rotational speed) of the rotational member 52 (wire drum 30). The preferred embodiment of the rotational member 52 disposes a south pole magnetic body and a north pole magnetic body in the rotational member 52 and the sensor 54 spaced in the circumferential direction, and the sensor 54 is a hole IC to detect magnetism. When the sensor 54 is directly mounted on the control substrate 53, a harness is made redundant, thereby winning advantages over electrical noises from the outside.

In FIG. 1, reference numeral 87 denotes a door open handle of the slide door 11, and the door open handle 87 is operatively connected to the ratchet 39 of the door latched unit 36, and releases the ratchet 39 from the latch 38.

Figure 16:
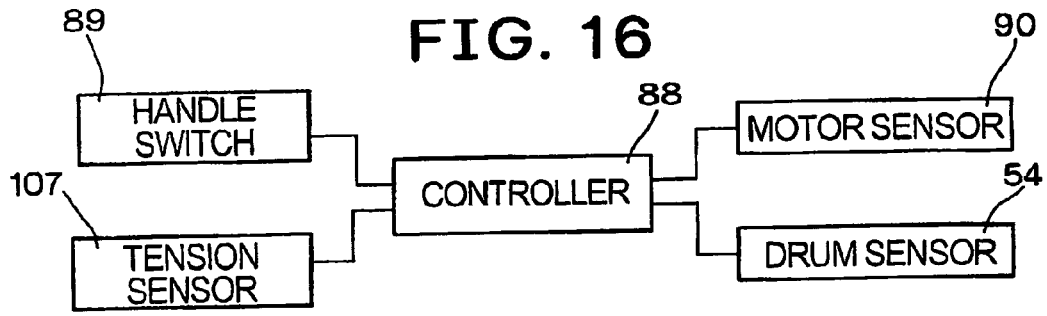
FIG. 16 is a block circuit view.

In FIG. 16, reference numeral 88 denotes a control unit, reference numeral 89 a handle switch to detect the door-opening operation of the door open handle 89, reference numeral 90 a motor sensor to detect the rotation of the motor 24 and preferably detect a motor pulse.

The power unit 20 shown in FIGS. 6 and 7 comprises a power slide function and a power release function, and both functions share with one piece of the motor 24.

(Operation)

The operation of the first clutch mechanism 31 will be described. In a state in which the electromagnetic coil unit 60 is turned off, a substantial friction resistance is not generated between the armature 61 and the electromagnetic coil unit 60. In this state, when the cylindrical worm 25 is rotated by forward rotation of the motor 24, the first work wheel 26 is rotated clockwise in FIG. 6, and the moving gear member 65 is also rotated clockwise by engagement between the leg portion 66 and the engaging groove 67. At this time, the moving gear member 65 has moved rightward by elastic force of the clutch releasing spring 70, and as shown in FIGS. 17 and 18, the moving gear portion 68 of the moving gear member 65 breaks away from the fixed gear portion 71 of the fixed gear member 69 (clutch disconnecting state). Further, the cam surface 72 of the moving member 65, as shown in FIG. 17, contacts the cam surface 64 of the cam member 63 in a state of close proximity to each other. Consequently, when the motor 24 is normally rotated in this state, the moving gear member 65, the cam member 63, and the armature 61 integral with the cam member 63 alone rotate together, and the moving gear member 65 does not move toward the fixed gear member 69.

In the above described state (FIGS. 17 and 18), when the electromagnetic coil unit 60 is turned on, the armature 61 is pulled to the electromagnetic coil unit 60 by generated magnetic force against the elastic force of the brake releasing spring 62, so that a predetermined brake resistance is generated between the electromagnetic coil unit 60 and the armature 61. This controls the co-rotation of the armature 61 and the cam member 63, and the moving gear member 65 rotates relatively to the cam member 63 with the first support shaft 28 as a center. Then, the cam surface 72 and the cam surface 64 are phase shifted as shown in FIG. 19, and the moving gear member 65 is pushed toward the fixed gear member 69 against the elastic force of the clutch releasing spring 70, and as shown in FIG. 20, the moving circular gear portion 68 of the moving gear member 65 engages with the fixed gear portion 71 of the fixed gear member 69, thereby being put into a normal clutch connecting state.

In this manner, the rotation of the motor 24 is transmitted to the wire drum 30 through the fixed gear member 69, and the door-closing cable 21B is would up so that the slide door 11 moves in the door-closing direction. Note that after the clutch is connected, the armature 61 and the cam member 63 also rotates together with the moving gear member 65.

When the motor 24 and the electromagnetic coil unit 60 are turned off during the movement of the slide door 11 in the door-closing door direction, the moving gear member 65 engaged with the first worm wheel 26 stops rotating, and the armature 61 and the cam member 63 are released from the brake resistance. By the elastic force of the clutch releasing spring 70, the moving gear 65 is returned rightward, while rotating the cam member 63 in a flank direction (downward in FIGS. 19 and 20). Then, before the moving gear member 65 comes off from the engaging state with the fixed gear member 69, as shown in FIGS. 21 and 22, the top portion 72A of the moving gear member 65 abuts against the clutch holding surface 64D of the cam member 63, and in this manner, the moving gear member 65 is unable to rotate the cam member 63, and at the same time, is put into a state in which the rightward movement is also controlled. Hence, even when the electromagnetic coil unit 60 is in an off state, the brake-clutch connecting state in which the moving gear member 65 engages with the fixed gear member 69 is maintained. In such a brake-clutch connecting state, since the slide door 11 is directly connected to a reduction mechanism of the motor 24 side, it is substantially kept in an immobile state. Consequently, if the user intentionally turns off the motor 24 and the electromagnetic coil unit 60, the slide door 11 can be held at a desired semi-door-open position. Further, when this pause is performed by automatic control by a control unit 88, a state in which the slide door 11 is opened about half by automatic operation can be also easily arrested and maintained.

Figure 23:
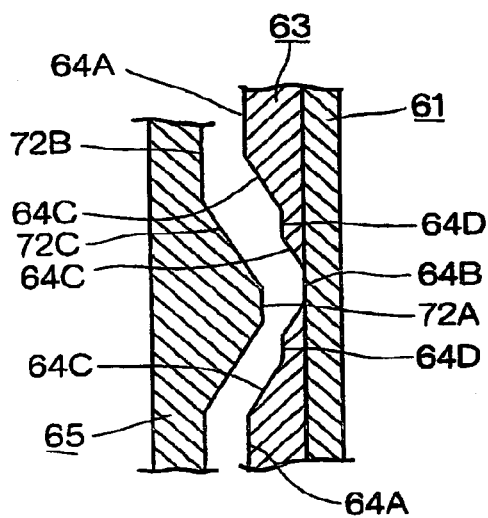
FIG. 23 is a side view showing the cam surface of the cam member and the cam surface of the moving gear member in the midst of releasing the brake-clutch connecting state.
Figure 24:
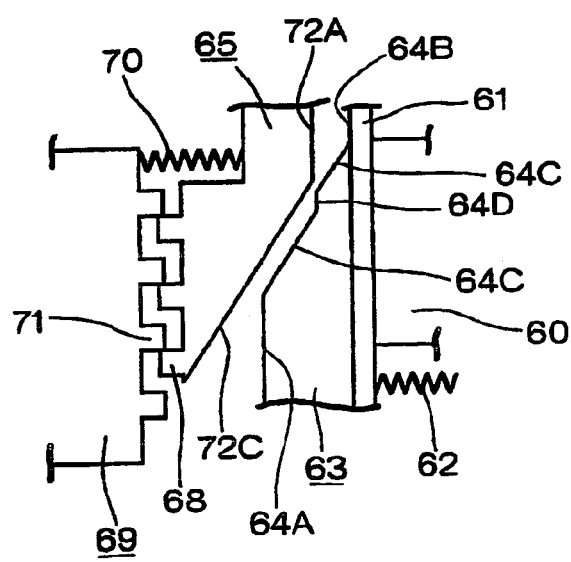
FIG. 24 is a schematic view showing the moving gear member and the fixed gear member in the midst of releasing the clutch connecting state corresponding to FIG. 23.

When the slide door 11 moves till the door-closed position by normal door-closing control by the control unit 88 (at this time, the first clutch mechanism 31 is in the normal clutch connecting state of FIGS. 19 and 20), the motor 24 is reversed just for a predetermined period of time (predetermined amount). Then, since the electromagnetic coil unit 60 continues to be turned on, with the armature 61 and the cam member 63 left behind, the moving gear member 65 moves upward by a predetermined amount in FIG. 20, and as shown in FIGS. 23 and 24, the top portion 72A of the moving gear member 65 moves upper than the clutch holding surface 64D of the cam member 63. When this state comes, the electromagnetic coil unit 60 and the motor 24 are turned off. In this manner, the moving gear member 65 moves rightward without the top portion 72A abutting against the clutch holding surface 64D of the cam member 63 by the elastic force of the clutch releasing spring 70, and returns to the clutch disconnecting state of FIGS. 17 and 18.

Next, the cancel release of the brake-clutch connecting state (FIGS. 21 and 22) of the first clutch mechanism 31 will be described. To change a brake-clutch connecting state to a clutch disconnecting state, first, the electromagnetic coil unit 60 is turned on. Then, the armature 61 and the cam member 63 are pulled to the electromagnetic coil unit 60, so that the brake resistance is given. At this stage, though the moving gear member 65 also slightly moves rightward by the elastic force of the clutch releasing spring 70, the engagement with the fixed gear member 69 still continues. Next, in the case of the motive power, the motor 24 is rotated, and the moving gear member 65 is rotated upward in the case of FIG. 22, and when the top portion 72A of the moving gear member 65 moves upper than the clutch holding surface 64D of the cam member 63, the electromagnetic coil unit 60 and the motor 24 are turned off. Then, the moving gear member 65 moves rightward by the elastic force of the clutch releasing spring 70 without the top portion 72 abutting against the clutch holding surface 64D of the cam member 63, and returns to the clutch disconnecting state of FIGS. 17 and 18.

In case the brake-clutch connecting state is to be released manually instead of the motive power of the motor 24, after the electromagnetic coil unit 60 is turned on, the slide door 11 is manually moved. Then, the wire drum 30 is rotated, and the moving gear member 65 is also rotated through the fixed gear member 69. At this time, in the brake-clutch connecting state, though the wire drum 30 is connected to the motor 24 side, since the gap Y formed between the leg portion 66 and the engaging groove 67 allows the moving gear member 65 to freely rotate approximately six degrees for the first worm wheel 26, the slide door 11 moves by slight operation force without rotating the first worm wheel 26, and can rotate the moving gear member 65. Subsequently, by the rotation of the moving gear member 65, when the top portion 72A of the moving gear member 65 comes off from the clutch holding surface 64D of the cam member 63, the moving gear member 65 moves rightward by the elastic force of the clutch releasing spring 70, and returns to the clutch disconnecting state of FIGS. 17 and 18.

In the case of the cancel release of the brake-clutch connecting state by the manual operation, when the control unit 88 detects the clutch manual releasing operation, as a "brake-clutch connection manual releasing control", the electromagnetic coil unit 60 is turned on for a predetermined period of time only. For the clutch manual releasing operation, though a variety of operations are conceivable, in the present invention, in the first place, the door-opening operation of the door open handle 87 of the slide door 11 is considered as the clutch manual releasing operation. In the second place, even when the slide door 11 moves by manual power for a predetermined amount, it may be considered as the clutch manual releasing operation. A predetermined amount of movement of the slide door 11 can be detected from a rotational amount of the wire drum 30. In this case, it is desirable to set this amount to the amount of movement exceeding the distance movable by the slight operation by the gap Y formed between the leg portion 66 and the engaging groove 67. When the set amount of movement is small, there is a possibility that the brake clutch connection manual releasing control is unintentionally performed by leaning against the slide door 11 or the like. Further, the predetermined amount of movement of the slide door 11 can be also detected by the sensor 107 of the tension mechanism 100. When the slide door 11 is moved by strong force, since the tension rollers 102 and 103 move against the elastic force of the tension spring 106, this movement may be detected by the sensor 107.

In the third place, the predetermined number of repetitive movements in the door-opening direction and the door-closing direction of the slide door 11 may be considered as the clutch manual releasing operation. When a person unaccustomed in the operation method of the slide door 11 confronts the situation where the slide door 11 does not move halfway through, it is expected that the slide door 11 is moved by intuition in the door-opening direction and the door-closing direction. Hence, even if the amount of movement of the slide door 11 is within the amount of movement movably by the slight operation by the gap Y formed between the leg portion 66 and the engaging groove 67, when the slide door 11 moves repeatedly in the door-opening direction and the door-closing direction, the brake clutch connection manual release control is performed.

The brake-clutch connecting state of the clutch mechanism 31 according to the present invention, as described above, is maintained even if the electromagnetic coil unit 60 is in an off state, and even if the brake-clutch connecting state is maintained for a long period of time, electric consumption by this function becomes substantially zero. Therefore, utilization of maintaining the slide door 11 at a full-door-open position by using this function becomes practical. Hence, in the present invention, when the slide door 11 moves till the full-door-open position by the normal open door control by the control unit 88 (at this time, the first clutch mechanism 31 is put into the normal clutch connecting state of FIGS. 19 and 20), the motor 24 and the electromagnetic coil unit 60 are turned off. Then, the moving gear member 65 engaged with the first worm wheel 26 stops rotating, and the armature 61 and the cam member 63 are released from the brake resistance, and the moving gear member 65 is returned rightward by elastic force of the clutch releasing spring 70, while rotating the cam member 63 in a flank direction (downward in FIGS. 19 and 20). Before the moving gear member 65 comes off from the engaging state with the fixed gear member 69, as shown in FIGS. 21 and 22, the top portion 72A of the moving gear member 65 abuts against the clutch holding surface 64D of the cam member 63, and the clutch mechanism 31 is maintained in the brake-clutch connecting state. In this brake-clutch connecting state, a strong resistance by the engagement between the cylindrical worm 25 and the first worm wheel 26 acts upon the slide door 11, and the holding power necessary to hold the slide door 11 is sufficiently filled, and a so-called "full open position holder" used conventionally can be made redundant. Further, the resistance by the engagement between the cylindrical worm 25 and the first worm wheel 26 is set weaker, and in cooperation with the full open position holder, the slide door 11 may be held at the full-door-open position. In this case, since the resistance by the engagement between the cylindrical worm 25 and the first worm wheel 26 can be set weaker, the manual moving of the slide door 11 can be made relatively easy at the failure time of the power unit 20.

Advantages

According to the clutch mechanism of the present invention, even if the electromagnetic coil unit 60 is turned off, the clutch connecting state (brake-clutch connecting state) can be continued. Hence, for example, when the power device of the present invention is used for a power slide device, since the slide door 11 which becomes a driven member can be held in a state in which it is connected to the speed reducer of the motor 24, the slider door can be held at a desired position by the strong resistance of the speed reducer. This clutch connecting state (brake-clutch connecting state) can be released by the control of the control unit.

Further, at the releasing time of the brake-clutch connecting state, the voltage required to turn on the electromagnetic coil unit 60 can be reduced lower than the normal battery voltage (approximately 5 v). Hence, even when the battery becomes weak, the brake-clutch connecting state can be released.

When the brake-clutch connecting function of the present invention is used as the full open position holder, power consumption becomes substantially zero, and the slider door can be held at the full-door-open position without imposing a burden on the battery. Further, since the brake-clutch connecting state is not released unless the electromagnetic coil unit is turned on, a full open position holding mechanism excellent in safety can be provided.

What is claimed is:

1. A power device comprising:
a clutch mechanism having a wheel arranged to be rotated about a support shaft by motor power, a fixed gear member supported by the support shaft, a moving gear member arranged to engage with the fixed gear member to transmit the rotation of the wheel to the fixed gear-member when moving to a normal clutch connecting position and to disengage from the fixed gear member when moving to a clutch disconnecting position, and a clutch releasing spring urging the moving gear member toward the clutch disconnecting position;
said moving gear member being engaged with the wheel so as to be able to receive torque of the motor through the wheel even if moving in either direction of a clutch connecting direction and a clutch disconnecting direction;
said clutch mechanism further having an armature capable of displacing the moving gear member to the clutch connecting position against an elastic force of the clutch releasing spring when rotating relatively to the moving gear member, and an electromagnetic coil unit capable of controlling a co-rotation state with the armature and the moving gear member by applying a brake resistance to the armature by pulling the armature by magnetism;

said moving gear member being displaced to the normal clutch connecting position when the motor and the electromagnetic coil are both turned on, and said clutch mechanism being put into an normal clutch connecting state in which the rotation of the motor is transmitted to the fixed gear member;

said armature being provided with a clutch holding surface which abuts against the moving gear member in the midst of returning from the normal clutch connecting position to the clutch disconnecting direction by the elastic force of the clutch releasing spring before the moving gear member disengages from the fixed gear member so as to hold the moving gear member at a brake-clutch connecting position where the engagement between the moving gear member and the fixed gear member is continued, thereby putting the clutch mechanism into a brake-clutch connecting state;

wherein an abutment of the clutch holding surface against the moving gear member is configured so as to allow the armature to co-rotate when the moving gear member rotates in case the electromagnetic coil unit is turned off; and a control unit to control the motor and the electromagnetic coil unit, said control unit having a normal clutch connection power release operation in which the abutment of the moving gear member against the clutch holding surface is released by rotating the motor in a reverse direction during the co-rotation state of the moving gear member and the armature is restricted by a continuous activation of the electromagnetic coil unit, and after that, the electromagnetic coil unit and the motor are turned off.

2. A power device comprising:

a clutch mechanism having a wheel arranged to be rotated about a support shaft by motor power, a fixed gear member supported by the support shaft, a moving gear member arranged to engage with the fixed gear member to transmit the rotation of the wheel to the fixed gear member when moving to a normal clutch connecting position and to disengage from the fixed gear member when moving to a clutch disconnecting position, and a clutch releasing spring urging the moving gear member toward the clutch disconnecting position;

said moving gear member being engaged with the wheel so as to be able to receive torque of the motor through the wheel even if moving in either direction of a clutch connecting direction and a clutch disconnecting direction;

said clutch mechanism further having an armature capable of displacing the moving gear member to the clutch connecting position against an elastic force of the clutch releasing spring when rotating relatively to the moving gear member, and an electromagnetic coil unit capable of controlling a co-rotation state with the armature and the moving gear member by applying a brake resistance to the armature by pulling the armature by magnetism;

said moving gear member being displaced to the normal clutch connecting position when the motor and the electromagnetic coil are both turned on, and said clutch mechanism being put into an normal clutch connecting state in which the rotation of the motor is transmitted to the fixed gear member;

said moving gear member being provided with a clutch holding surface which abuts against the armature in the midst of a return of the moving gear member from the normal clutch connecting position to the clutch disconnecting direction by the elastic force of the clutch releasing spring before the moving gear member disengages from the fixed gear member so as to hold the moving gear member at a brake-clutch connecting position where the engagement between the moving gear member and the fixed gear member is continued, thereby putting the clutch mechanism into a brake-clutch connecting state;

wherein an abutment of the clutch holding surface against the armature is configured so as to allow the armature to co-rotate when the moving gear member rotates in case the electromagnetic coil unit is turned off; and a control unit to control the motor and the electromagnetic coil unit, said control unit having a normal clutch connection power release operation in which the abutment of the armature against the clutch holding surface is released by rotating the motor in a reverse direction during the co-rotation state of the moving gear member and the armature is restricted by a continuous activation of the electromagnetic coil unit, and after that, the electromagnetic coil unit and the motor are turned off.

3. A power device comprising:

a clutch mechanism having a wheel arranged to be rotated about a support shaft by motor power, a fixed gear member supported by the support shaft, a moving gear member arranged to engage with the fixed gear member to transmit the rotation of the wheel to the fixed gear member when moving to a normal clutch connecting position and to disengage from the fixed gear member when moving to a clutch disconnecting position, and a clutch releasing spring urging the moving gear member toward the clutch disconnecting position;

said moving gear member being engaged with the wheel so as to be able to receive torque of the motor through the wheel even if moving in either direction of a clutch connecting direction and a clutch disconnecting direction;

said clutch mechanism further having an armature capable of displacing the moving gear member to the clutch connecting position against an elastic force of the clutch releasing spring when rotating relatively to the moving gear member, and an electromagnetic coil unit capable of controlling a co-rotation state with the armature and the moving gear member by applying a brake resistance to the armature by pulling the armature by magnetism;

said moving gear member being displaced to the normal clutch connecting position when the motor and the electromagnetic coil are both turned on, and said clutch mechanism being put into an normal clutch connecting state in which the rotation of the motor is transmitted to the fixed gear member;

said armature being provided with a clutch holding surface which abuts against the moving gear member in the midst of returning from the normal clutch connecting position to the clutch disconnecting direction by the elastic force of the clutch releasing spring before the moving gear member disengages from the fixed gear member so as to hold the moving gear member at a brake-clutch connecting position where the engagement between the moving gear member and the fixed gear member is continued, thereby putting the clutch mechanism into a brake-clutch connecting state;

wherein an abutment of the clutch holding surface against the moving gear member is configured so as to allow the armature to co-rotate when the moving gear member rotates in case the electromagnetic coil unit is turned off; and a control unit to control the motor and the electromagnetic coil unit, said control unit having a brake-clutch connection manual release operation in which when detecting a clutch manual release action, the control unit turns the electromagnetic coil from off to on, and restricts the co-rotation state of the moving gear member and the armature by a predetermined period of time.

4. The power device according to claim 3, wherein the engagement in the rotational directions of the moving gear member and the wheel is provided with a gap.

5. The power device according to claim 4, wherein an angle in which the moving gear member can rotate by the gap for the wheel is larger than the angle of the clutch holding surface.

6. A power device comprising:

a clutch mechanism having a wheel arranged to be rotated about a support shaft by motor power, a fixed gear member supported by the support shaft, a moving gear member arranged to engage with the fixed gear member to transmit the rotation of the wheel to the fixed gear member when moving to a normal clutch connecting position and to disengage from the fixed gear member when moving to a clutch disconnecting position, and a clutch releasing spring urging the moving gear member toward the clutch disconnecting position;

said moving gear member being engaged with the wheel so as to be able to receive torque of the motor through the wheel even if moving in either direction of a clutch connecting direction and a clutch disconnecting direction;

said clutch mechanism further having an armature capable of displacing the moving gear member to the clutch connecting position against an elastic force of the clutch releasing spring when rotating relatively to the moving gear member, and an electromagnetic coil unit capable of controlling a co-rotation state with the armature and the moving gear member by applying a brake resistance to the armature by pulling the armature by magnetism;

said moving gear member being displaced to the normal clutch connecting position when the motor and the electromagnetic coil are both turned on, and said clutch mechanism being put into an normal clutch connecting state in which the rotation of the motor is transmitted to the fixed gear member;

said moving gear member being provided with a clutch holding surface which abuts against the armature in the midst of a return of the moving gear member from the normal clutch connecting position to the clutch disconnecting direction by the elastic force of the clutch releasing spring before the moving gear member disengages from the fixed gear member so as to hold the moving gear member at a brake-clutch connecting position where the engagement between the moving gear member and the fixed gear member is continued, thereby putting the clutch mechanism into a brake-clutch connecting state;

wherein an abutment of the clutch holding surface against the armature is configured so as to allow the armature to co-rotate when the moving gear member rotates in case the electromagnetic coil unit is turned off; and a control unit to control the motor and the electromagnetic coil unit, said control unit having a brake-clutch connection manual release operation in which when detecting a clutch manual release action, the control unit turns the electromagnetic coil from off to on, and restricts the co-rotation state of the moving gear member and the armature by a predetermined period of time.

7. The power device according to claim 6, wherein the engagement in the rotational directions of the moving gear member and the wheel is provided with a gap.

8. The power device according to claim 7, wherein an angle in which the moving gear member can rotate by the gap for the wheel is larger than the angle of the clutch holding surface.

* * * * *